C. HALLAUER.
COMBINED CENTRIFUGAL AND AIR LIFT PUMP.
APPLICATION FILED DEC. 26, 1917.
1,295,981.
Patented Mar. 4, 1919.
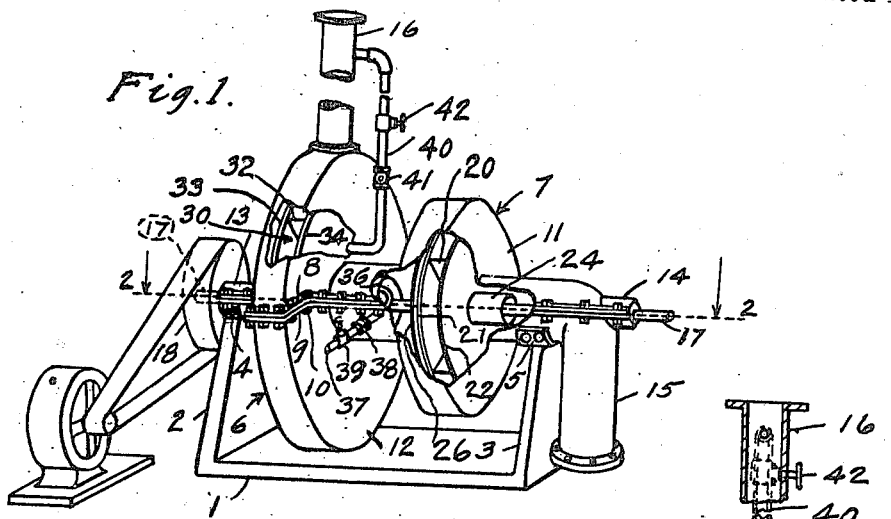
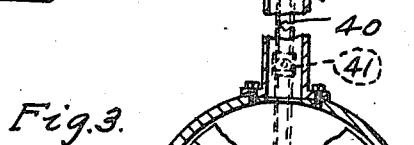
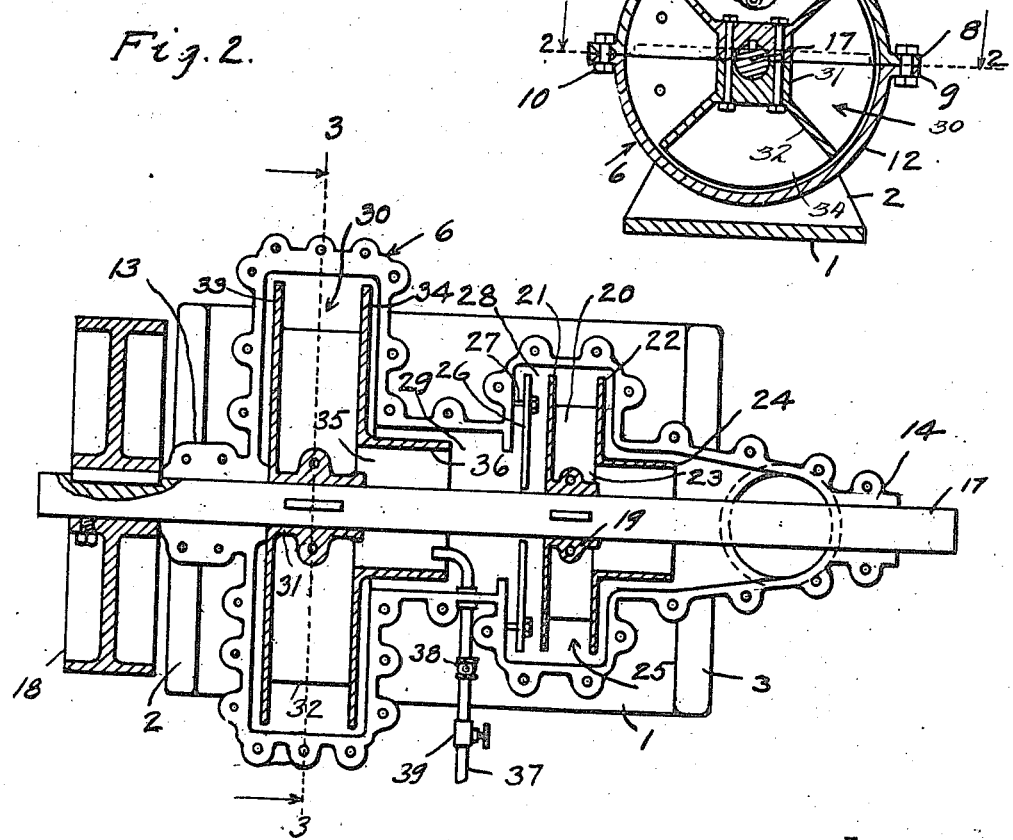
Inventor.
Carl Hallauer,
by Hazard & Miller
Attys.

UNITED STATES PATENT OFFICE.

CARL HALLAUER, OF LOS ANGELES, CALIFORNIA.

COMBINED CENTRIFUGAL AND AIR-LIFT PUMP.

1,295,981.   Specification of Letters Patent.   Patented Mar. 4, 1919.

Application filed December 26, 1917. Serial No. 208,787.

*To all whom it may concern:*

Be it known that I, CARL HALLAUER, a citizen of the United States, residing at Los Angeles, in the county of Los Angeles and State of California, have invented new and useful Improvements in Combined Centrifugal and Air-Lift Pumps, of which the following is a specification.

My object is to combine the principles and advantages of a centrifugal pump with the principles and advantages of an air lift pump in a single machine, so as to increase the effective height to which water may be discharged, with a saving in power.

Figure 1 is a perspective of a combined centrifugal and air lift pump embodying the principles of my invention, parts being broken away.

Fig. 2 is a horizontal and longitudinal section on the lines 2—2 of Figs. 1 and 3, this being the parting line between the two halves of the outer casing, and the upper half of the casing being removed.

Fig. 3 is a vertical cross-section through the discharging impeller and taken on the line 3—3 of Fig. 2.

The base 1 is rectangular in plan and somewhat longer than its width, and supporting pillars 2 and 3 extend upwardly from the ends of the base. Bearing supports 4 and 5 are formed integral with the upper ends of the pillars 2 and 3 and the lower half 6 of the impeller casing is mounted upon and attached to these supports 4 and 5. The upper half 7 of the impeller casing is mounted upon the lower half 6, and flanges 8 and 9 extending from the half casings 6 and 7 are secured together by bolts 10 to complete the casing. The casing is shaped to form the suction impeller housing 11, the discharge impeller housing 12, the shaft bearings 13 and 14, the intake pipe 15, and the discharge pipe 16. The drive shaft 17 is mounted in the bearings 13 and 14 and a drive pulley 18 is fixed upon the shaft.

The suction impeller comprises the hub 19 keyed upon the shaft 17 in the housing 11, blades 20 extending radially from the hub, the disk 21 extending from the hub along the inner edges of the blades 20 and beyond the outer ends of the blades, the disk 22 at the opposite edges of the blades from the disk 21 and having an intake opening 23 around the hub, and the intake pipe 24 connected to the inner edge of the disk 22 around the opening 23, thus forming the suction impeller 25. The hub 19 and disks 21 and 22 are split like a split pulley. The intake pipe 15 extends vertically from the level of the base 1 outside of the pillar 3, then horizontally to the side of the housing 11, and the pipe 24 is mounted concentric to the shaft 17 within the upper end of the intake pipe 15. A baffle plate 26 formed in two pieces is inserted into the housing 11 half way between the disk 21 and the discharge side of the housing and secured in place by bolts 27, the plate fitting closely around the shaft 17 and there being a passage 28 leading from the periphery of the impeller 25 around the outer edge of the baffle plate 26 and between the baffle plate and the wall of the housing toward the shaft and communicating with the passage 29, the wall of which is concentric with the shaft 17 and connects the housings 11 and 12.

The discharge impeller 30 comprises the hub 31 keyed upon the shaft 17, the blades 32 extending radially from the hub, the disk 33 extending from the end of the hub along the back edges of the blades 32 and outwardly beyond the ends of the blades, the disk 34 extending along the front edges of the blades 32 and having an intake opening 35 around the hub 31, and the intake pipe 36 mounted in the passage 29 concentric to the shaft 17 and connected to the inner edge of the disk 34 around the opening 35. This impeller is also split like a split pulley and fits in the housing 12 so as to run freely. The housing 12 communicates with the discharge pipe 16.

An air inlet pipe 37 is tapped through the wall of the casing and extends into the passage 29 and then bent backwardly parallel with the shaft 17 and extends into the end of the intake pipe 36, and a check valve 38 and a regulating valve 39 are incorporated into this pipe, the check valve opening inwardly to admit air to the impeller 30 and the regulating valve serving to increase or decrease the amount of air or the air resistance.

The air outlet or relief pipe 40 is tapped through the front wall of the housing 12 just outside of the wall forming the passage 29 and extends vertically outside of the housing. A check valve 41 and a regulating valve 42 are incorporated into this pipe, the check valve opening upwardly to relieve the air pressure within the housing 12 and the regulating valve serving to increase or decrease the resistance to the air passing upwardly through the pipe.

The discharge impeller 30 is considerably larger than the suction impeller 25 and they are both mounted rigidly and operated from one shaft and the operation will tend to create a vacuum in the discharge impeller, thus causing a suction of air through the pipe 37, and the larger part of this air is mixed with the water, causing innumerable air bubbles and thereby appreciably lightening the weight of the discharge column of water. Air that fails to mix and discharge with the water may gather in the housing 12 and the relief pipe 40 is intended to take care of this and prevent the impeller from being air bound. The upper end of the relief pipe 40 is connected with the discharge casing 16, at a point where the pressure of the air in the relief pipe is slightly greater than that of the column of water and air in the discharge casing 16, so that the air from the relief pipe 40 will freely enter said casing.

When the combined centrifugal and air lift pump thus constructed is set and operated, the suction impeller 25 will lift water from a depth of from twenty to thirty feet and discharge this water to the mouth of the pipe 36, and the action of the discharge impeller will lift a solid column of water upwardly 75 to 100 feet, and the introduction of more or less air will appreciably lighten the specific gravity of water and lighten the column of water and increase the height to which it may be lifted, so that by pulling water upwardly to the machine as high as it can be pulled, and then pushing it upwardly as high as it can be pushed, the distance from the lower end of the intake pipe to the upper end of the discharge pipe is practically double the distance that water could be operated by a single machine either pulling or pushing.

The impeller mechanism in the housing 11 forms a centrifugal suction pump, and the impeller mechanism in the housing 12 forms a centrifugal air lift pump, and the suction pump discharges to the air lift pump.

While I have shown the preferred construction of my pump as now known to me, it will be understood by those skilled in the art that various changes in the combination, construction and arrangement of parts may be made without departing from the spirit of my invention, as claimed.

I claim:

1. In a combined centrifugal and air lift pump, a casing forming a suction impeller housing, a discharge impeller housing, a tubular connection between the suction impeller housing and the discharge impeller housing, an intake pipe leading to the suction impeller housing, a discharge pipe leading from the discharge impeller housing, and shaft bearings, a drive shaft mounted in the shaft bearings, a suction impeller mounted upon the shaft in the suction impeller housing, a discharge impeller mounted upon the shaft in the discharge impeller housing; the suction impeller discharging into the discharge impeller; means for admitting air to the discharge impeller, and a relief pipe for the discharge impeller.

2. In a combined centrifugal and air lift pump, a casing forming a suction impeller housing, a discharge impeller housing, a tubular connection between the suction impeller housing and the discharge impeller housing, an intake pipe leading to the suction impeller housing, a discharge pipe leading from the discharge impeller housing, and shaft bearings, a drive shaft mounted in the shaft bearings, a suction impeller mounted upon the shaft in the suction impeller housing, a discharge impeller mounted upon the shaft in the discharge impeller housing; the suction impeller discharging into the discharge impeller, and means for admitting air to the discharge impeller.

In testimony whereof I have signed my name to this specification.

CARL HALLAUER.